US012476928B2

United States Patent
Heikkinen

(10) Patent No.: US 12,476,928 B2
(45) Date of Patent: Nov. 18, 2025

(54) QUOTABLE STORIES AND STICKERS FOR MESSAGING APPLICATIONS

(71) Applicant: Snap Inc., Santa Monica, CA (US)

(72) Inventor: Christie Marie Heikkinen, Sherman Oaks, CA (US)

(73) Assignee: SNAP INC., Santa Monica, CA (US)

( * ) Notice: Subject to any disclaimer, the term of this patent is extended or adjusted under 35 U.S.C. 154(b) by 35 days.

(21) Appl. No.: 18/393,195

(22) Filed: Dec. 21, 2023

(65) Prior Publication Data

US 2024/0223520 A1 Jul. 4, 2024

Related U.S. Application Data

(60) Provisional application No. 63/478,093, filed on Dec. 30, 2022.

(51) Int. Cl.
*H04L 51/10* (2022.01)
*H04L 51/02* (2022.01)
*H04L 51/52* (2022.01)

(52) U.S. Cl.
CPC .............. *H04L 51/10* (2013.01); *H04L 51/02* (2013.01); *H04L 51/52* (2022.05)

(58) Field of Classification Search
None
See application file for complete search history.

(56) References Cited

U.S. PATENT DOCUMENTS

| 2012/0131041 | A1* | 5/2012 | Ashland | G06Q 10/101 |
| | | | | 707/769 |
| 2017/0243136 | A1* | 8/2017 | Ho Kang | H04L 51/046 |
| 2019/0166400 | A1* | 5/2019 | Andreou | G06Q 50/01 |
| 2023/0376186 | A1* | 11/2023 | Boda | G06F 3/0482 |

OTHER PUBLICATIONS

Peterson, Jake. Your Answers to Those Instagram Question Stickers, Jul. 13, 2018, Gadget Hacks Shop, Dec. 14, 2023, Accessed on the internet: https://smartphones.gadgethacks.com/news/fyi-your-answers-those-instagram-question-stickers-arent-anonymous-0185932/. (Year: 2018) (Year: 2018).*

* cited by examiner

*Primary Examiner* — Natisha D Cox
(74) *Attorney, Agent, or Firm* — SCHWEGMAN LUNDBERG & WOESSNER, P.A.

(57) ABSTRACT

A system includes one or more hardware processors and at least one memory storing instructions that cause the one or more hardware processors to perform operations including receiving, via a client device, one or more response messages to a question sticker or to a story, and selecting, via the client device, a response message of the one or more response messages for publication. The operations also include selecting, via the client device, a privacy setting for the response message, and publishing, via the client device, the response message.

20 Claims, 14 Drawing Sheets

QUOTABLE STORIES AND STICKERS FOR MESSAGING APPLICATIONS

CROSS-REFERENCE TO RELATED APPLICATION

This patent application claims the benefit of U.S. Provisional Patent Application No. 63/478,093, filed Dec. 30, 2022, entitled "QUOTABLE STORIES AND STICKERS FOR MESSAGING APPLICATIONS", which is incorporated by reference herein in its entirety.

BACKGROUND

Camera systems, such as a camera disposed on a mobile device, can capture a variety of electronic images and video. The popularity of image and video capture continues to grow. Users increasingly share media content items such as electronic images and videos with each other via messaging applications. For example, a user can create media content and share it via a message program.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

BRIEF DESCRIPTION OF THE DRAWINGS

Figure 1:
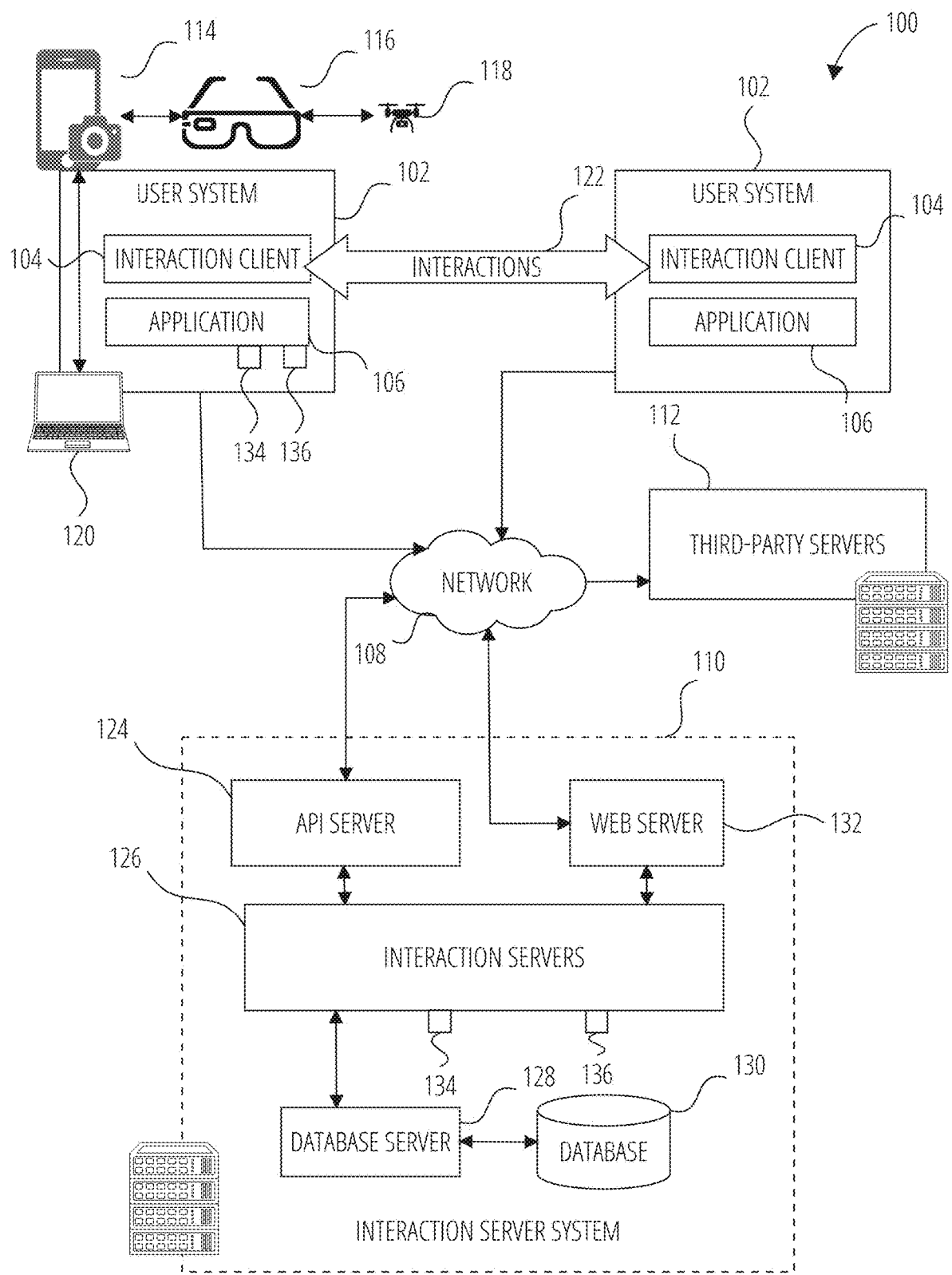

FIG. 1 is a diagrammatic representation of a networked environment in which the present disclosure may be deployed, according to some examples.

Figure 2:
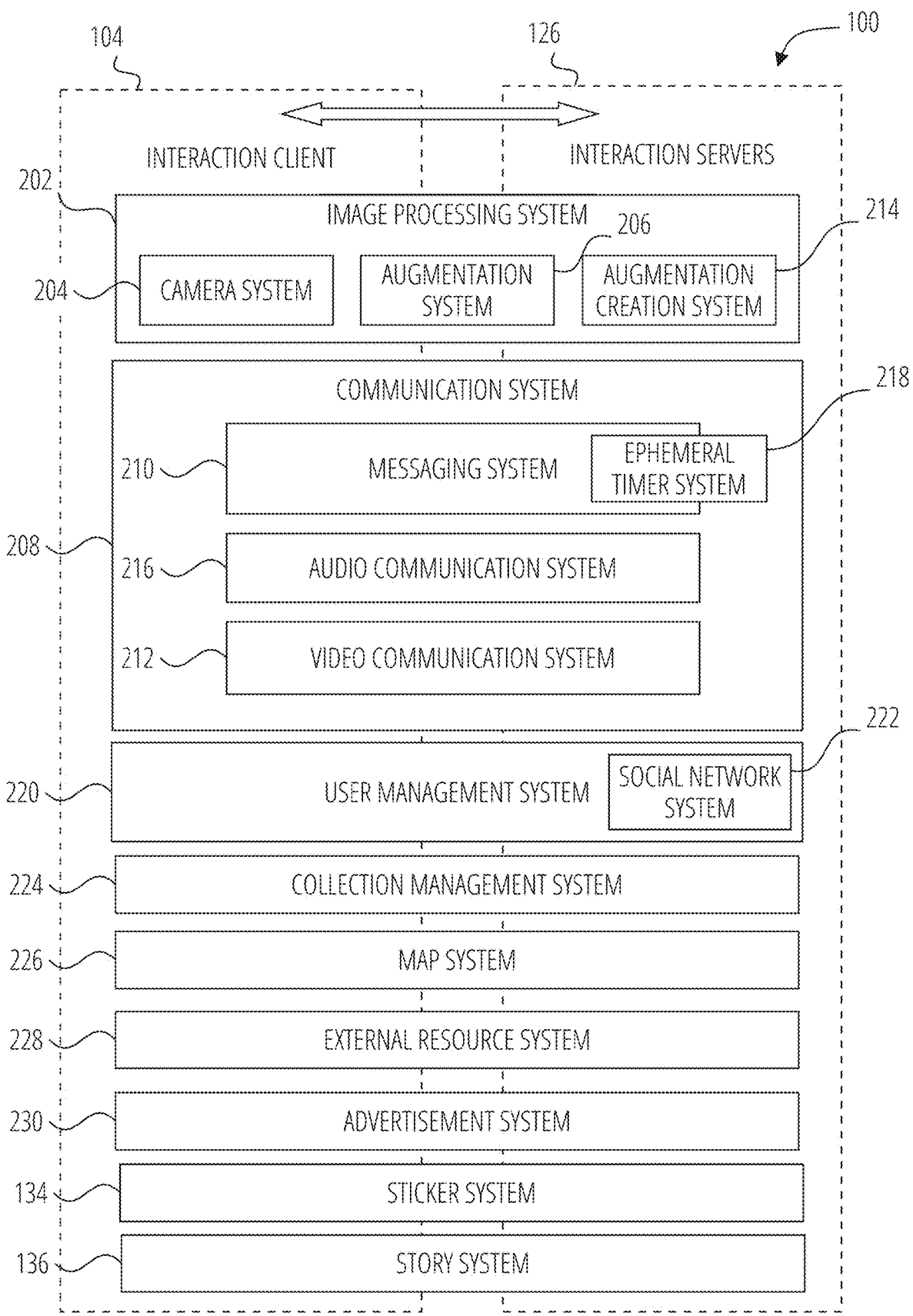

FIG. 2 is a diagrammatic representation of a messaging system, according to some examples, that has both client-side and server-side functionality for quotable stories and/or question stickers.

Figure 3:
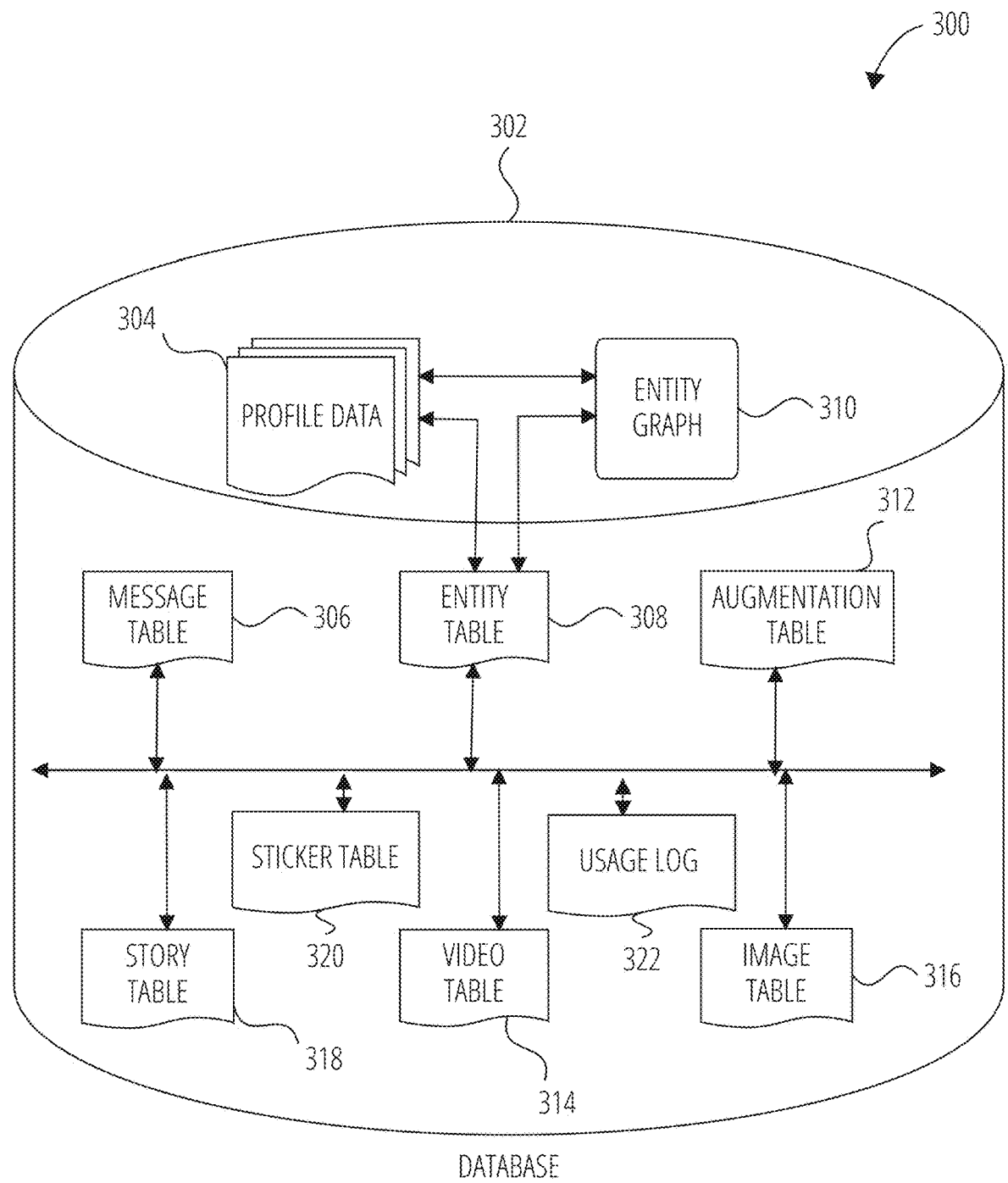

FIG. 3 is a diagrammatic representation of a data structure as maintained in a database, according to some examples.

Figure 4:
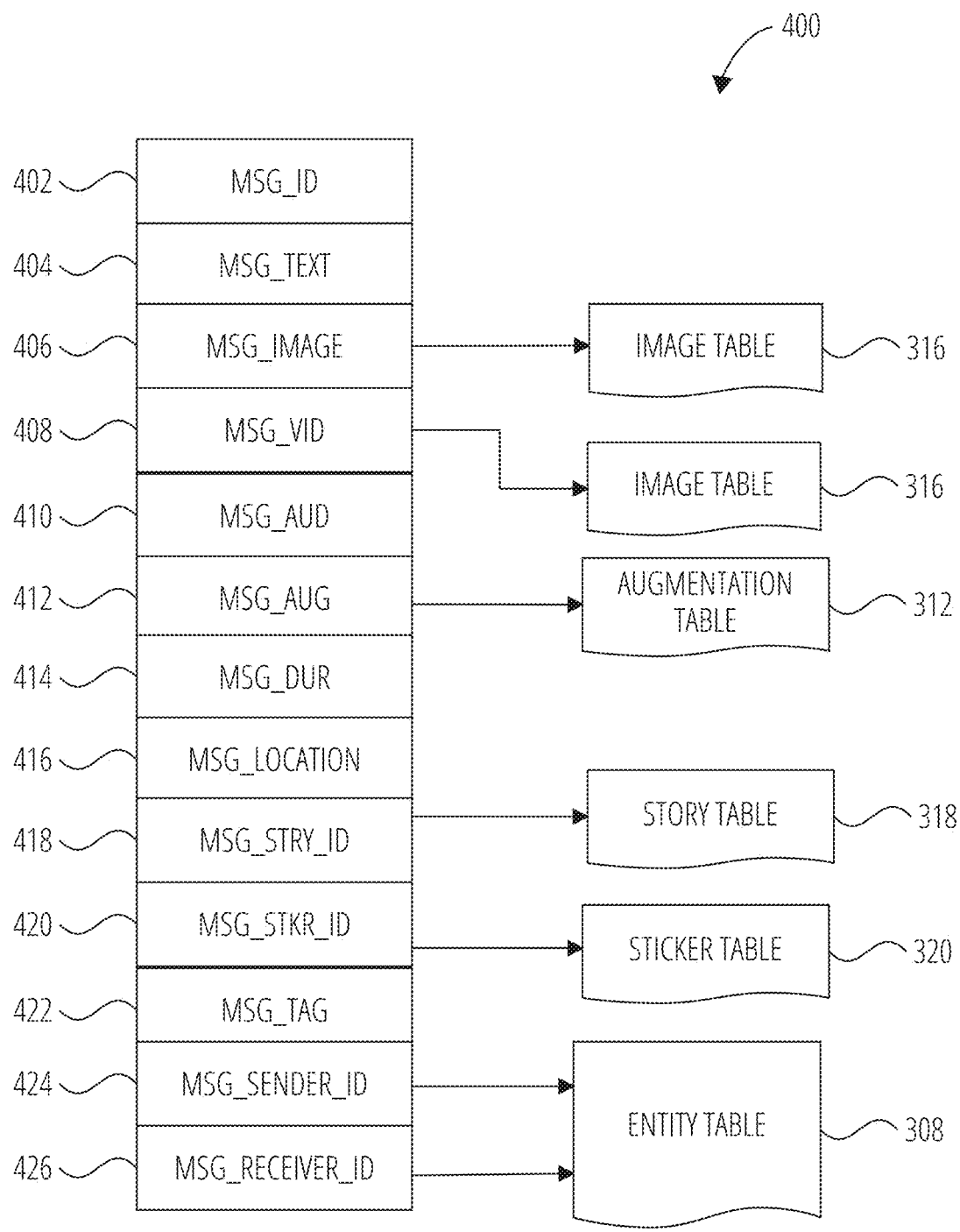

FIG. 4 is a diagrammatic representation of a message, according to some examples.

Figure 5:
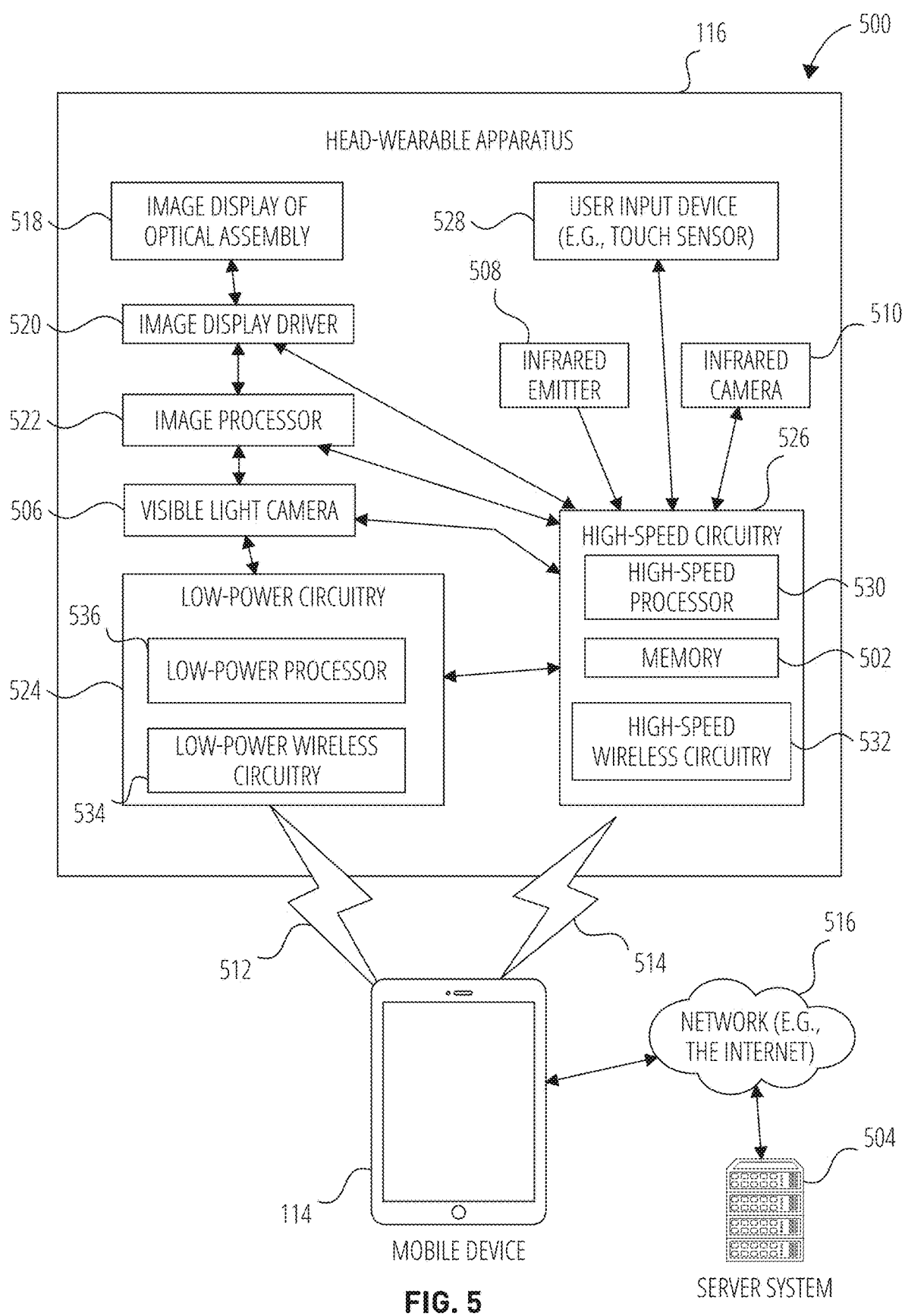

FIG. 5 illustrates a system in which the head-wearable apparatus, according to some examples.

Figure 6:
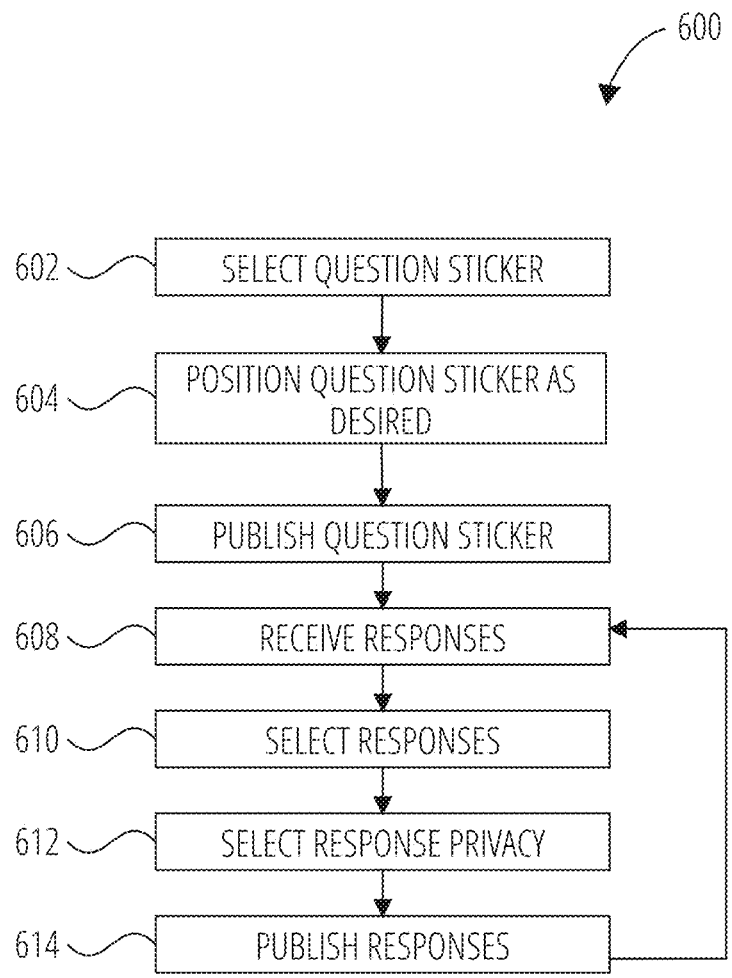

FIG. 6 illustrates an example process for using questions stickers, according to some examples.

Figure 7:
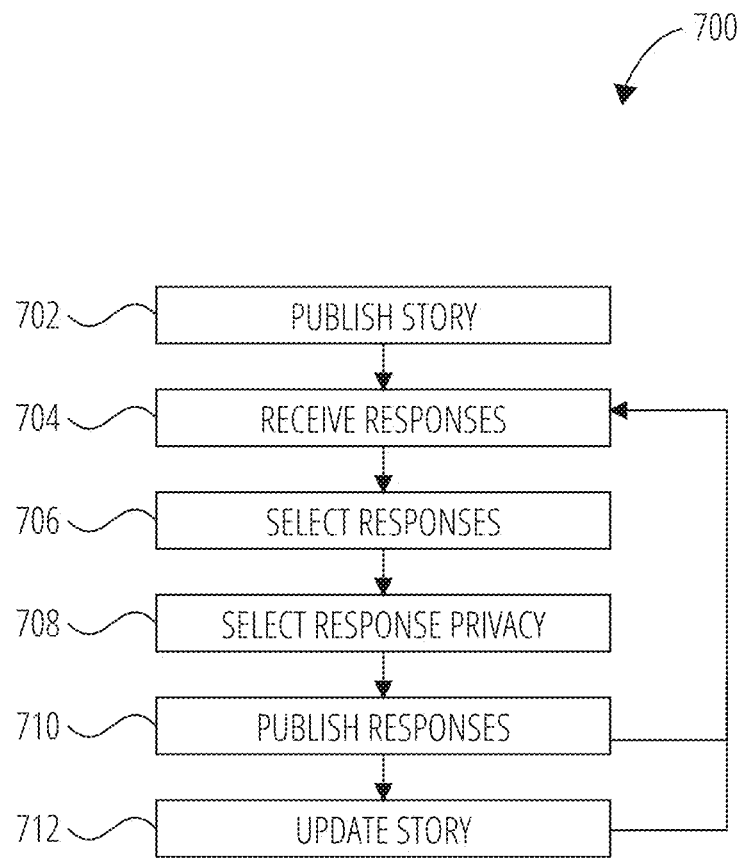

FIG. 7 illustrates an example process for using quotable stories, according to some examples.

Figure 8:
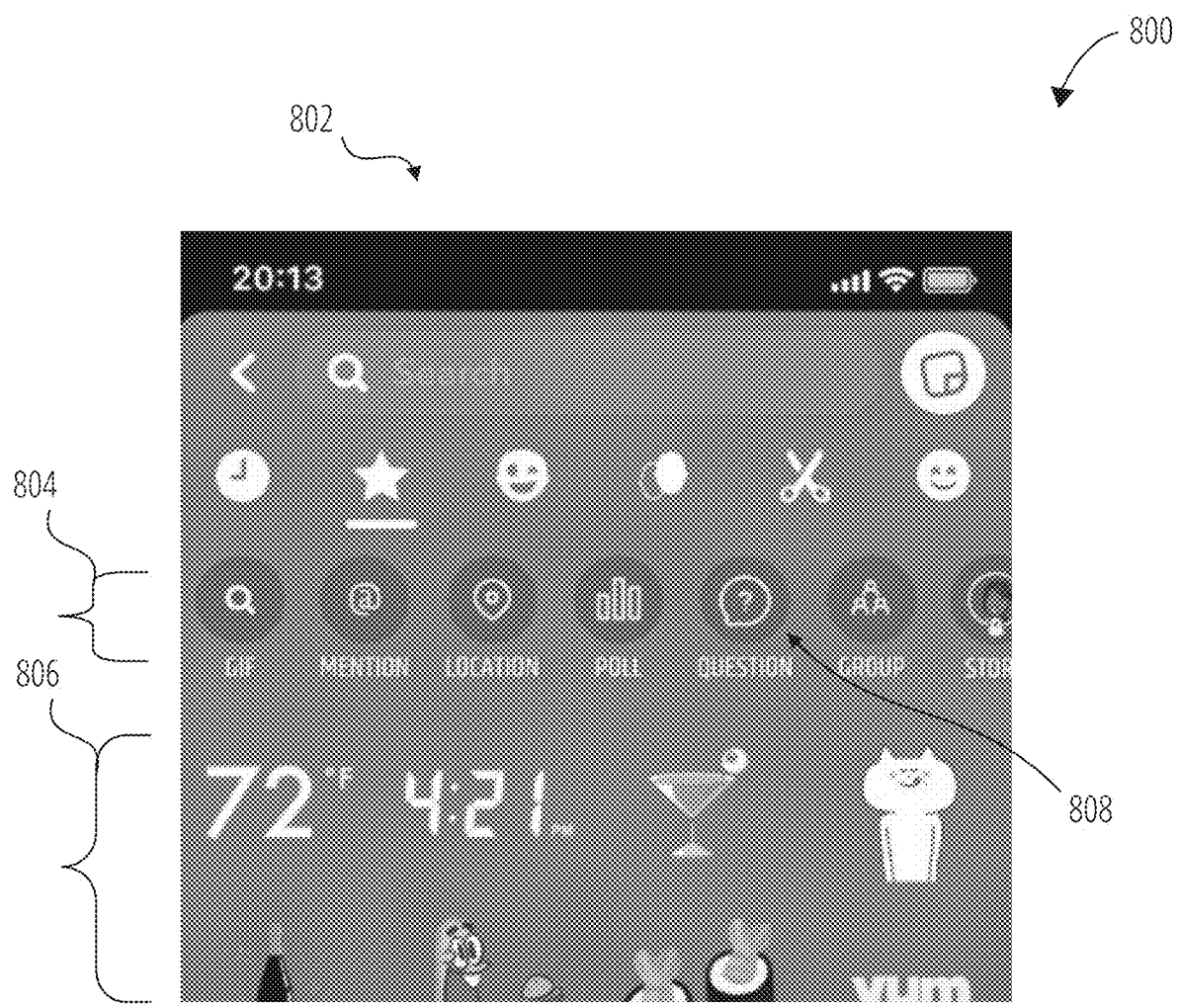

FIG. 8 illustrates an example screenshot of a GUI for selecting stickers, according to some examples.

Figure 9:
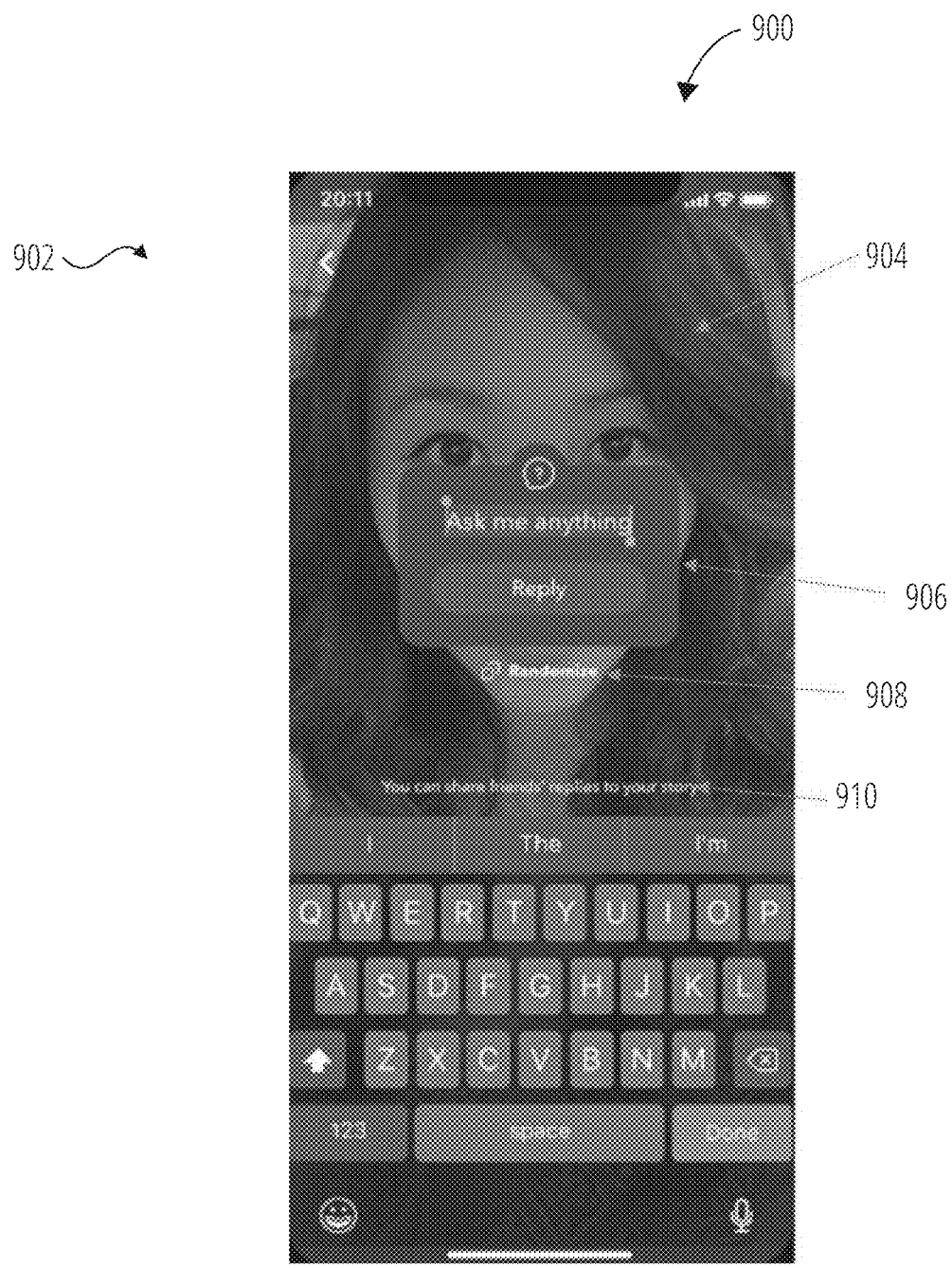

FIG. 9 illustrates an example screenshot of a GUI for placing a question sticker, according to some examples.

Figure 10:
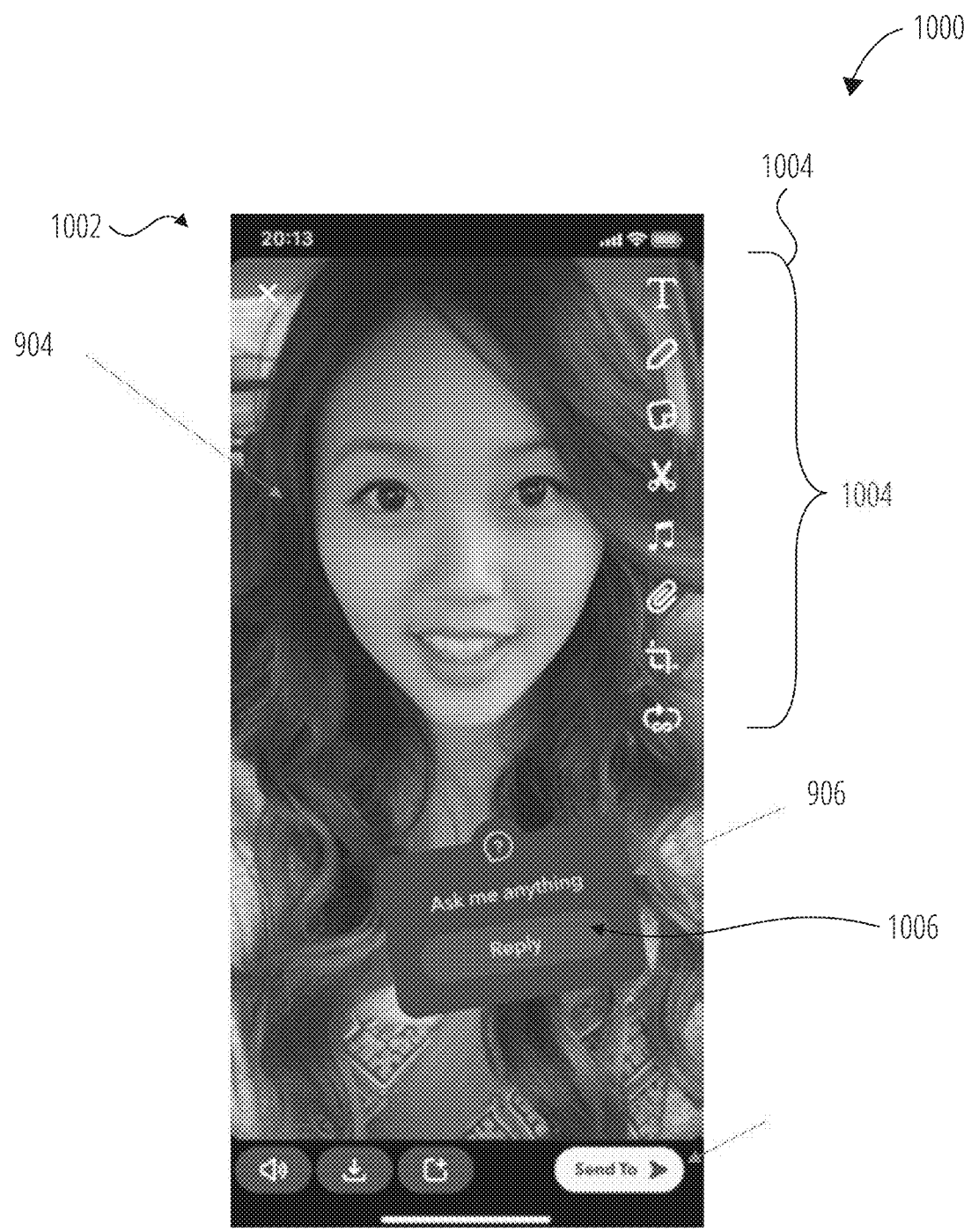

FIG. 10 illustrates an example screenshot of a GUI for previewing a message having a question sticker, according to some examples.

Figure 11:
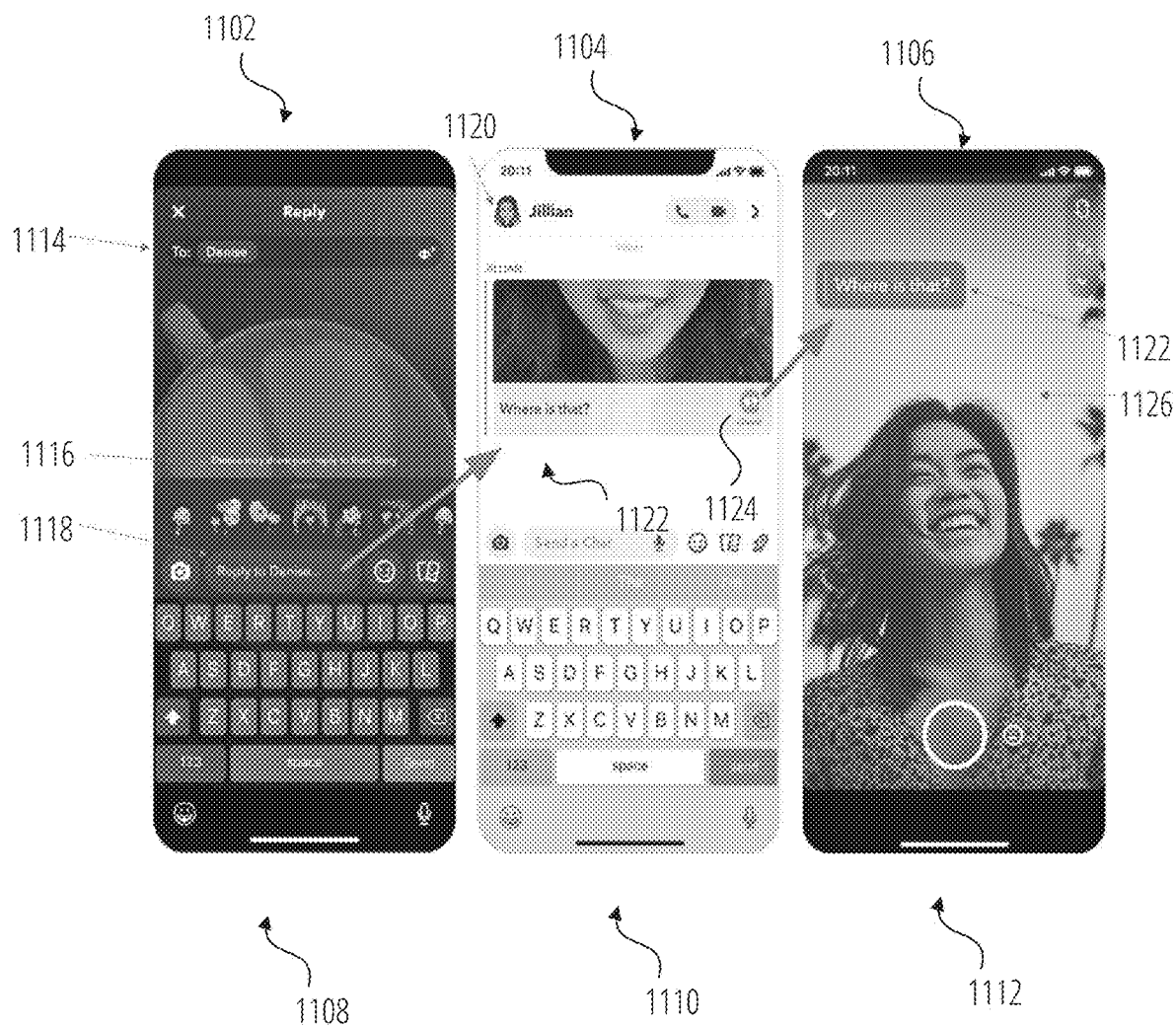

FIG. 11 illustrates three example screenshots of GUIs for replying, receiving a reply, and publishing the reply to a question sticker and/or a story, according to some examples.

Figure 12:

FIG. 12 illustrates three example screenshots of GUIs for displaying a to a question sticker and/or a story using different display techniques, according to some examples.

Figure 13:
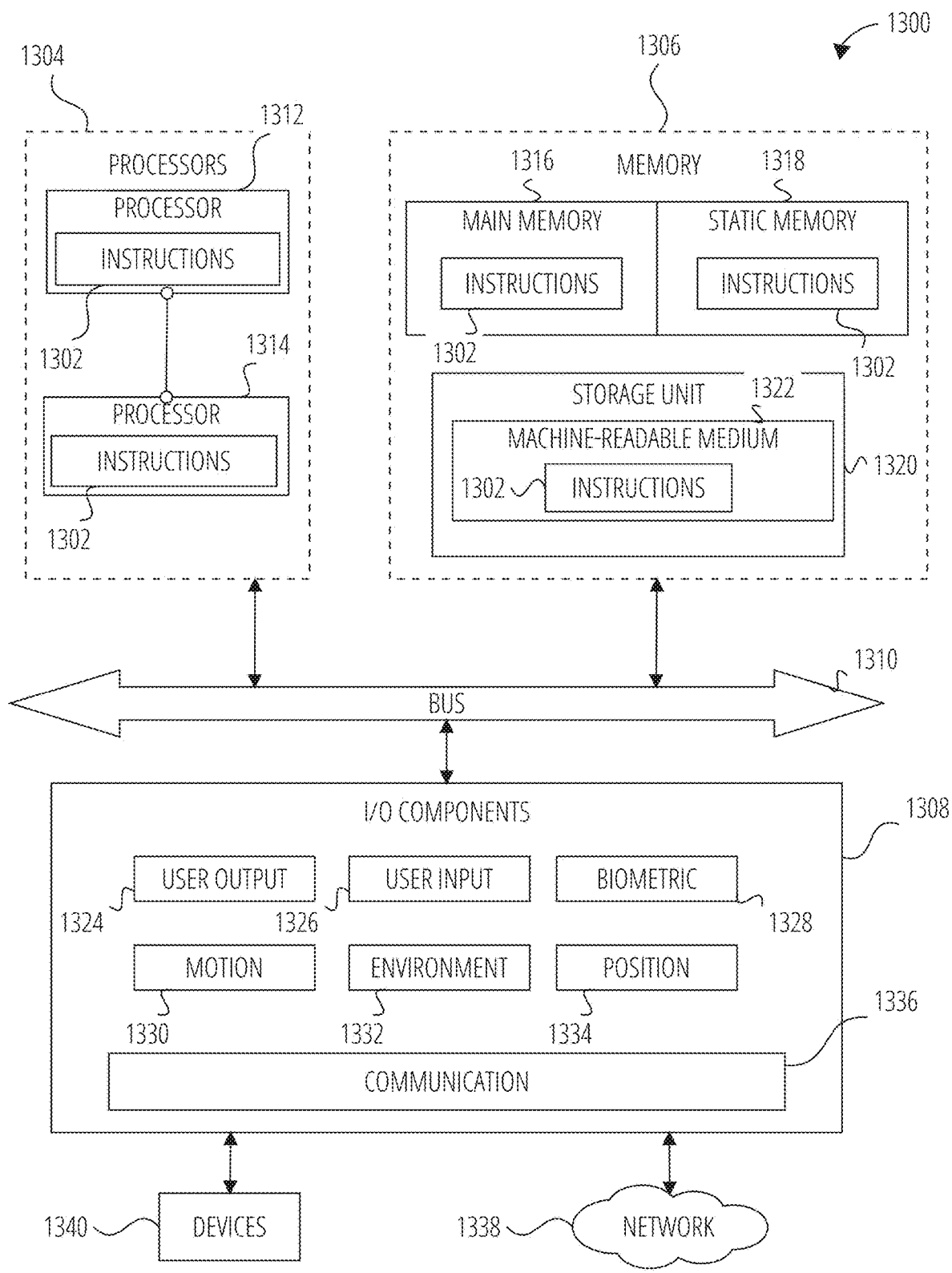

FIG. 13 is a diagrammatic representation of a machine in the form of a computer system within which a set of instructions may be executed to cause the machine to perform any one or more of the methodologies discussed herein, according to some examples.

Figure 14:
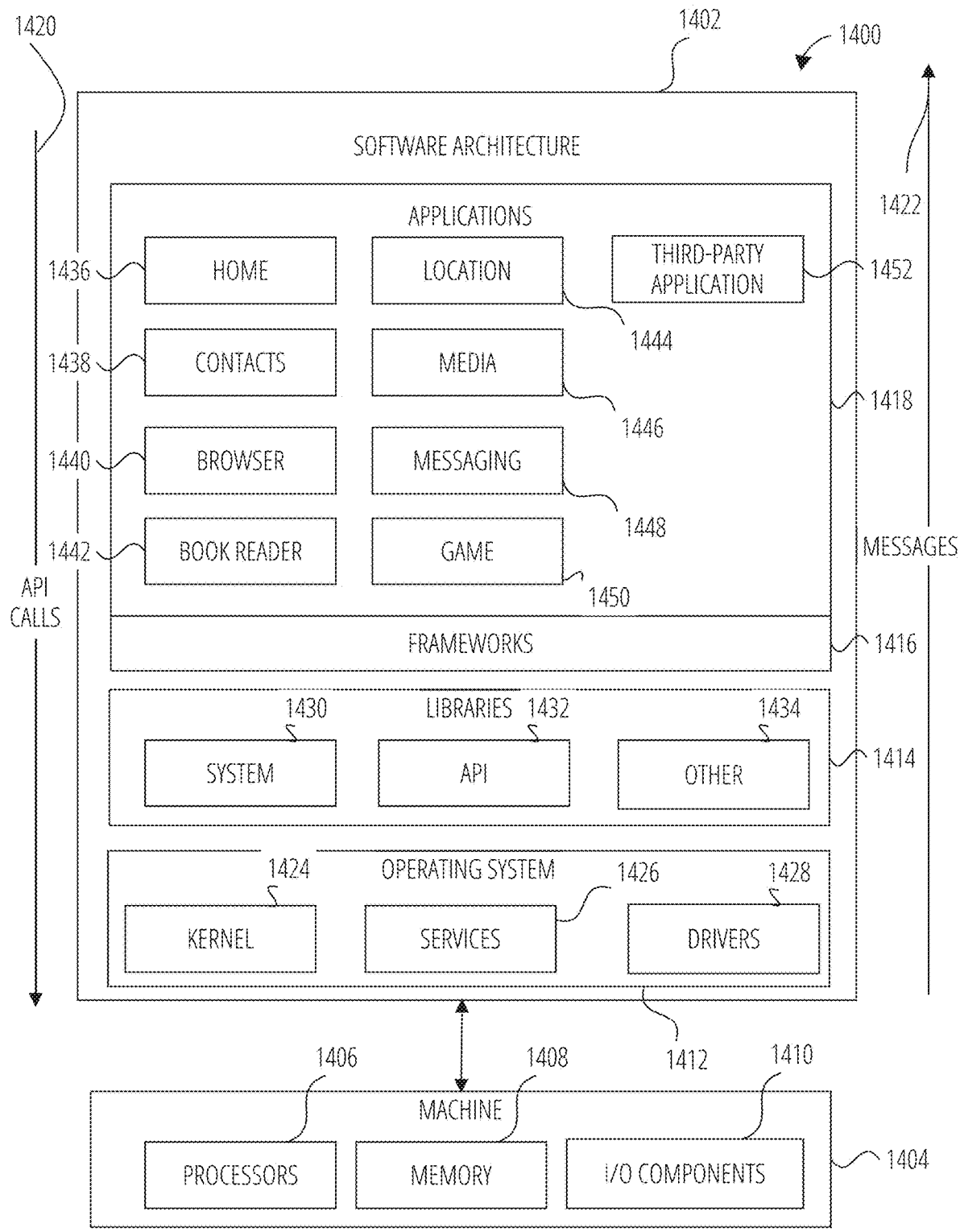

FIG. 14 is a block diagram showing a software architecture within which examples may be implemented.

DETAILED DESCRIPTION

Camera systems are included in a variety of devices such as mobile devices, smart watches, drones, and so on. The camera systems enable a user to take images and video and are communicatively and/or operatively coupled to certain applications, such as messaging applications. In some examples, the messaging application enables a user to create a "story," which can include collections of pictures, video, and other media content. The story may include a time limit, after which the messaging application automatically deletes the story. "Stickers" can also be used, which include text and other media content. The sticker can be overlaid onto pictures, video, and other media content.

The techniques described herein provide for improved content creation and engagement in certain messaging applications by providing for question stickers and quotable stories that can lead to further engagement, for example, by members of a social network. The question stickers can include contextual stickers that have pre-designed messages, for example, based on holidays, upcoming events (e.g., music concerts), special days (e.g., national Independence Day, Valentine's Day, and so on), friends' birthdays, and the like. The question stickers can also include randomized messages to enable the user to more efficiently ask for questions or ask for user feedback in a more engaging manner. Certain privacy features are also incorporated. For example, responses can be shared via the messaging application without attribution, thus anonymizing the response.

When the user creates a story, the story includes a collection one or more pictures, videos, and other media (e.g., sounds such as music, augmented reality (AR) content, photographic filters, and so on), and the viewers of the story can participate in the story creation, for example, via "quotable replies." That is, a story creator can receive a message from a viewer (e.g., member of the story creator's social group) and then decide to incorporate the reply as part of the story. The reply can also be anonymized, for example, by incorporating the reply without attribution. By enabling a more private and engaging collaboration, for example, via question stickers and quotable stories, the techniques described herein provide for a more efficient and engaging presentation of media content.

Networked Computing Environment

It may be beneficial to describe certain systems that implement the techniques described herein. Turning now to FIG. 1, the figure is a block diagram showing an example interaction system 100 for facilitating interactions (e.g., exchanging text messages, conducting text audio and video calls, creating media content, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, a drone 118, and a computer client device 120 that are communicatively connected to exchange data and messages. An interaction client 104 interacts with other interaction clients 104 and with the interaction server system 110 via the network 108. The data exchanged between the interaction clients 104 (e.g., interactions 122) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 124 is coupled to and provides programmatic interfaces to interaction servers 126, making the functions of the interaction servers 126 accessible to interaction clients 104, other applications 106 and third-party server 112. The interaction servers 126 are communicatively coupled to a database server 128, facilitating access to a database 130 that stores data associated with interactions processed by the interaction servers 126. Similarly, a web server 132 is coupled to the interaction servers 126 and provides web-based interfaces to the interaction servers 126. To this end, the web server 132 processes incoming network requests over the Hypertext Transfer Protocol (HTTP) and several other related protocols.

The Application Program Interface (API) server 124 receives and transmits interaction data (e.g., commands and message payloads) between the interaction servers 126 and the client systems 102 (and, for example, interaction clients 104 and other application 106) and the third-party server 112. Specifically, the Application Program Interface (API) server 124 provides a set of interfaces (e.g., routines and protocols) that can be called or queried by the interaction client 104 and other applications 106 to invoke functionality of the interaction servers 126. The Application Program Interface (API) server 124 exposes various functions supported by the interaction servers 126, including account registration; login functionality; the sending of interaction data, via the interaction servers 126, from a particular interaction client 104 to another interaction client 104; the communication of media files (e.g., images or video) from an interaction client 104 to the interaction servers 126; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The application 106 includes a sticker system 134. The sticker system 134 can present via a graphical user interface (GUI), a set of stickers to use when creating media content. For example, the user can take a picture or video via the mobile device 114, the head-wearable apparatus 116, the drone 118, and/or the computer client device 120 and overlay the sticker on onto the picture or video. The sticker content or overlay can include text and/or media (e.g., pictures, video, AR augmentations). In certain examples, the stickers include a question sticker. The question sticker can be placed or overlaid at various locations of the photo or video to elicit one or more responses. In some examples, the user selects the question sticker for viewing only among a subset of users, such as a friends group. Responses to the question sticker from the friends group are provided to the user that placed the question sticker. The user that placed the question sticker can then decide to allow certain responses to be visible to others. The question sticker also includes an indication (graphical or textual indication) that responses may be shared.

The sticker system 134 can also include certain pre-defined questions to ask. For example, a list of pre-defined questions can be randomized, and when a user selects the questions sticker, a random entry or subset of the pre-defined questions can be presented for selection. The sticker system 134 can also provide for contextual question stickers. For example, contextual question stickers may be presented during certain holidays, special days (e.g., Valentine's Day, Independence Day), events (e.g., music concerts), friends' birthdays, and the like, whose context is the holiday, special day, event, and/or birthday. Accordingly, the contextual question sticker includes text (e.g., pre-defined questions) and/or media focused on the specific context. Accordingly, the sticker system 134 provides for randomized questions, contextual stickers, and privacy levels, resulting in a more efficient and private way to engage in online discourse.

The application 106 additionally includes a story system 136. The story system 136 enables for the creation of time-limited collections of pictures, video, and other media (e.g., text, AR augmentations) that tells a user's story. For example, the user can post updates to their story during the day, showing a subset of users, such as a friends group, the user's activities during the day. Various story types are provided, such as a "personal story" in the form of a collection of content that has been created and sent/broadcast by a single user, a "live story" that constitutes a curated stream of user-submitted content from various locations and events by multiple users, and/or a "location story," which enables a user whose user system 102 is located within a specific geographic location (e.g., on a college or university campus) to contribute to a particular collection.

The story system 136 provides for "quotable" stories. For example, a personal quotable story is provided, such that the story creator can receive messages based on the story and then decide if the message should also become part of the story. In certain examples, the addition to the story via the message is anonymized. That is, the message is incorporated into the story, for example, without attribution, thus preserving anonymity. Likewise, messages can be directed to live stories and location stories, which can then be incorporated by certain story creators in an anonymized manner. The stories with the messages are then distributed to other user systems 102, for example, via the interaction servers 126. The interaction servers 126 host multiple systems and subsystems, including server-side components of the sticker system 134 and the story system 136, as described in more detail below with reference to FIG. 2.

System Architecture

FIG. 2 is a block diagram illustrating further details regarding the interaction system 100, according to some examples. Specifically, the interaction system 100 is shown to comprise the interaction client 104 and the interaction servers 126. The interaction system 100 embodies multiple subsystems, which are supported on the client-side by the interaction client 104 and on the server-side by the interaction servers 126. Example subsystems are discussed below.

An image processing system 202 provides various functions that enable a user to capture and augment (e.g., annotate or otherwise modify or edit) media content associated with a message, for example, using media content captured via a camera system 204. The camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., created via a photographic filter or a virtual lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and
Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 130 and accessed through the database server 128.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 304) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

An external resource system 228 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 126. The SDK includes Application Programming Interfaces (APIs) with functions that can be called or invoked by the web-based application. The interaction servers 126 host a JavaScript library that provides a given external resource access to specific user data of the interaction client 104. HTML5 is an example of technology for programming games, but applications and resources programmed based on other technologies can be used.

As mentioned above, the sticker system 134 provides for question stickers with randomized, pre-defined text and/or media. For example, the sticker system 134 can download a list of pre-defined text and/or media from the database 130, including contextual pre-defined text and/or media. The contextual pre-defined text and/or media is based on a date or date range associated with certain holidays, special days (e.g., Valentine's Day, Independence Day), events (e.g., music concerts), friends' birthdays, and the like. For example, pre-defined contextual text can include "Will you be my Valentine?," "Need 4th of July Ideas," "What to wear for New Years?," and so on. The publishing of responses can be vetted, for example, by the user that placed the question sticker, and the responding user may be kept anonymous.

The story system 136 includes the ability to send messages targeted to a story, thus creating a quotable story. For example, a personal quotable story is provided, such that the story creator can receive messages based on the story and then decide if the message should also become part of the story. In certain examples, the user responsible for the message added to the story kept anonymous by not attributing the message to any one user. Likewise, messages can be directed to live stories and location stories, which can then be incorporated by certain story creators in an anonymized manner. Users responding via question stickers and/or quotable stories are made aware that their content can be selected for publication, for example, by visual or textual means described in more detail below.

To integrate the functions of the SDK into the web-based resource, the SDK is downloaded by the third-party server 112 from the interaction servers 126 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 126. The interaction servers 126 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth. An advertisement system 230 operationally enables the purchasing of advertisements by third parties for presentation to end-users via the interaction clients 104 and also handles the delivery and presentation of these advertisements.

Data Architecture

FIG. 3 is a schematic diagram illustrating data structures 300, which may be stored in the database 302 of the interaction server system 110, according to certain examples. While the content of the database 302 is shown to comprise multiple tables, it will be appreciated that the data could be stored in other types of data structures (e.g., as an object-oriented database).

The database 302 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 304. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 304 stores multiple types of profile data about a particular entity. The profile data 304 may be selectively used and presented to other users of the interaction system 100 based on privacy settings specified by a particular entity. Where the entity is an individual, the profile data 304 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 304 for the group may similarly include one or more avatar representations associated with the group, in addition to the group name, members, and various settings (e.g., notifications) for the relevant group. The database 302 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, a quotable story can include messages sent by certain users (e.g., members of a friends group). The message table 306 can store the sent messages and link them to the story table 318, for example, via another table, via columns in the tables 306 and/or 318, and the like. Accordingly, quotable story data can include messages from the message table 306 and story data from the story table 318.

The video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 302 also include a sticker table 320 storing both pre-defined text and/or media as well as user created text and/or media. For example, common messaging questions such as "What are you up to?," "Having a nice day?," "Ready for the weekend?," and so on, can be stored as text and/or images in the sticker table 320 and then presented in a randomized manner, for example, during selection of the question sticker. Responses to the questions sticker can be stored as messages in the message table 306. The response messages stored in the message table 306 can be linked to questions stored in the sticker table 320 via linked tables, columns, and so on.

A usage log 322 is also depicted. The usage log 322 captures anonymized information (e.g., information that has user identification removed, for example, to comply with jurisdictional laws and regulations) for music/sounds being played, as well as any filter/virtual lens that is being used during music/sound playback. The usage log 322 also captures anonymized geolocation data of locations where the music/sound playback occurs, number of times the music/sound playback occurs, and the like.

Data Communications Architecture

FIG. 4 is a schematic diagram illustrating a structure of a message 400, according to some examples, generated by an interaction client 104 for communication to a further interaction client 104 via the interaction servers 126. The content of a particular message 400 is used to populate the message table 306 stored within the database 302, accessible by the interaction servers 126. Similarly, the content of a message 400 is stored in memory as "in-transit" or "in-flight" data of the user system 102 or the interaction servers 126. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message sticker identifier 420: identifier values identifying one or more stickers, including question stickers, which can include photographic filters, text, images, video, or other annotations or enhancements.

Message tag 422: each message 400 may be tagged with multiple tags, each of which is indicative of the subject matter of content included in the message payload. For example, where a particular image included in the message image payload 406 depicts an animal (e.g., a lion), a tag value may be included within the message tag 422 that is indicative of the relevant animal. Tag values may be generated manually, based on user input, or may be automatically generated using, for example, image recognition.

Message sender identifier 424: an identifier (e.g., a messaging system identifier, email address, or device identifier) indicative of a user of the user system 102 on which the message 400 was generated and from which the message 400 was sent.

Message receiver identifier 426: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in the story table 318, values stored within the message sticker identifier 420 may point to data stored in the sticker table 320, and values stored within the message sender identifier 424 and the message receiver identifier 426 may point to user records stored within an entity table 308.

System with Head-Wearable Apparatus

FIG. 5 illustrates a system 500 including a head-wearable apparatus 116 with a selector input device, according to some examples. FIG. 5 is a high-level functional block diagram of an example head-wearable apparatus 116 communicatively coupled to a mobile device 114 and various server systems 504 (e.g., the interaction server system 110) via various networks 108.

The head-wearable apparatus 116 includes one or more cameras, each of which may be, for example, a visible light camera 506, an infrared emitter 508, and an infrared camera 510.

The mobile device 114 connects with head-wearable apparatus 116 using both a low-power wireless connection 512 and a high-speed wireless connection 514. The mobile device 114 is also connected to the server system 504 and the network 516.

The head-wearable apparatus 116 further includes two image displays of the image display of optical assembly 518. The two image displays of optical assembly 518 include one associated with the left lateral side and one associated with the right lateral side of the head-wearable apparatus 116. The head-wearable apparatus 116 also includes an image display driver 520, an image processor 522, low-power circuitry 524, and high-speed circuitry 526. The image display of optical assembly 518 is for presenting images and videos, including an image that can include a graphical user interface to a user of the head-wearable apparatus 116.

The image display driver 520 commands and controls the image display of optical assembly 518. The image display driver 520 may deliver image data directly to the image display of optical assembly 518 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 528 (e.g., touch sensor or push button), including an input surface on the head-wearable apparatus 116. The user input device 528 (e.g., touch sensor or push button) is to receive from the user an input selection to manipulate the graphical user interface of the presented image.

The components shown in FIG. 5 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 506 can include digital camera elements such as a complementary metal oxide-semiconductor (CMOS) image sensor, charge-coupled device, camera lenses, or any other respective visible or light-capturing elements that may be used to capture data, including images of scenes with unknown objects. The head-wearable apparatus 116 includes a memory 502, which stores instructions to perform a subset or all of the functions described herein. The memory 502 can also include storage device.

As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 in order to drive the left and right image displays of the image display of optical assembly 518. The high-speed processor 530 may be any processor capable of managing high-speed communications and operation of any general computing system needed for the head-wearable apparatus 116. The high-speed processor 530 includes processing resources needed for managing high-speed data transfers on a high-speed wireless connection 514 to a wireless local area network (WLAN) using the high-speed wireless circuitry 532. In certain examples, the high-speed processor 530 executes an operating system such as a LINUX operating system or other such operating system of the head-wearable apparatus 116, and the operating system is stored in the memory 502 for execution. In addition to any other responsibilities, the high-speed processor 530 executing a software architecture for the head-wearable apparatus 116 is used to manage data transfers with high-speed wireless circuitry 532. In certain examples, the high-speed wireless circuitry 532 is configured to implement Institute of Electrical and Electronic Engineers (IEEE) 802.11 communication standards, also referred to herein as WiFi. In some examples, other high-speed communications standards may be implemented by the high-speed wireless circuitry 532.

The low-power wireless circuitry 534 and the high-speed wireless circuitry 532 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 512 and the high-speed wireless connection 514, may be implemented using details of the architecture of the head-wearable apparatus 116, as can other elements of the network 516.

The memory 502 includes any storage device capable of storing various data and applications, including, among other things, camera data generated by the left and right visible light cameras 506, the infrared camera 510, and the image processor 522, as well as images generated for display by the image display driver 520 on the image displays of the image display of optical assembly 518. While the memory 502 is shown as integrated with high-speed circuitry 526, in some examples, the memory 502 may be an independent standalone element of the head-wearable apparatus 116. In certain such examples, electrical routing lines may provide a connection through a chip that includes the high-speed processor 530 from the image processor 522 or the low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the head-wearable apparatus 116 can be coupled to the camera (visible light camera 506, infrared emitter 508, or infrared camera 510), the image display driver 520, the user input device 528 (e.g., touch sensor or push button), and the memory 502. The head-wearable apparatus 116 is connected to a host computer. For example, the head-wearable apparatus 116 is paired with the mobile device 114 via the high-speed wireless connection 514 or connected to the server system 504 via the network 516. The server system 504 may be one or more computing devices as part of a service or network computing system, for example, that includes a processor, a memory, and network communication interface to communicate over the network 516 with the mobile device 114 and the head-wearable apparatus 116.

The mobile device 114 includes a processor and a network communication interface coupled to the processor. The network communication interface allows for communication over the network 516, low-power wireless connection 512, or high-speed wireless connection 514. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 512 and high-speed wireless connection 514 from the mobile device 114 via the low-power wireless circuitry 534 or high-speed wireless circuitry 532. The head-wearable apparatus 116 is used to capture and/or display media content, including media created by the augmentation system 206, the sticker system 134, and the story system 136.

FIG. 6 illustrates an example process 600 for using questions stickers in the interaction system 100, according to some examples. In the depicted example, the process 600 selects, at block 602, a question sticker to use. The question sticker includes text and/or media (e.g., pictures, video, AR augmentations) to solicit responses from, for example, a social network. In some examples, the question sticker selection includes selecting a pre-defined question sticker. That is, a pre-defined list of text and/or media can be presented to the user during the selection at block 602, such as a randomized pre-defined list of text and/or media. In some examples, the process 600 takes into account a current date to contextually present the pre-defined list of text and/or media. For example, a date or date range associated with certain holidays, special days (e.g., Valentine's Day, Independence Day), events (e.g., music concerts), friends' birthdays, and the like, results in pre-defined contextual text or media that can include "Will you be my Valentine?," "Need 4th of July Ideas," "What to wear for New Years?," and so on. The process 600 also provides, at block 602, for a graphical user interface (GUI) to manually enter the text and/or media in addition to or in lieu of the pre-defined text and/or media.

The process 600 then positions, at block 604, the question sticker. That is, the question sticker is an overlay which can be positioned on top of certain media, such as on top of a picture, video, AR augmentation, and so on, to enhance aesthetics and prevent clutter or positioning to cover certain portions of the media, e.g., a user's face, text and so on. The user can thus use a graphical user interface (GUI), such as a touch and gesture-based GUI, to position the question sticker into a desired location.

The process 600 then publishes the questions sticker as an overlay on the media. For example, the interaction system 100 is used to provide to other users, via the user systems 102, the question sticker published as an overlay on the media. The process 600 then receives one or more responses, such as response messages sent from other users that have received the publication. In certain examples, the response messages are provided, at block 608, to the user that published the question sticker, who then receives the response messages.

The process 600 then selects, at block 610, one or more of the response messages, for example, for additional publication. In certain examples, the user receiving the response messages can select one or more of the response messages as good for publication alongside the published question sticker, for example, as an answer to a question posed. The process 600, in some examples, can select or assign, at block 612, a privacy setting to the response, such as an anonymous setting. For example, the response message can be selected to be used without attribution to keep the sender of the response message anonymous.

The process 600 then publishes, at block 614, the one or more selected responses alongside the question sticker. For example, the interaction system 100 is used to provide to other users, via the user systems 102, the responses positioned to be seen with the question sticker. The process 600 can then iterate back to block 608, continuously receiving further responses and publishing the selected responses to be seen with other responses and with the questions sticker. In some examples, the publication of the question sticker and associated responses will automatically cease after a certain time period has elapsed by using the ephemeral timer system 218. Accordingly, the techniques described herein enable a user to more efficiently ask for user feedback in a more engaging manner.

FIG. 7 illustrates an example process 700 for using stories in the interaction system 100, according to some examples. In the depicted example, the process 700 publishes, at block 702, a story to use, for example, via the interaction system 100 to provide to other users, via the user systems 102, the story. As mentioned above, the story includes a collection of media, including text, pictures, video, and so on. The media may be set to play in a certain timed order (e.g., timeline order of when the media was captured via the camera system 204). The story can include a personal quotable story, such that the story creator can receive response messages based on the story and then decide if the response message should also become part of the story. Other quotable story types include live quotable stories that include curated streams of user-submitted content from one or more locations by one or more users, and location quotable stories that include content submissions within a specific geographic location (e.g., college campus, media event, family picnic at a park, and so on).

The process 700 then receives, at block 704, one or more response messages for the published story. Similar to process 600 described above, the process 700 receives one or more responses, such as response messages sent from other users that have received the published story. In certain examples, the response messages are provided, at block 704, to the user that published the story, or to the user who published one of the media content included in the story's collection, who then receives the response messages.

The process 700 then selects, at block 706, one or more of the response messages, for example, for additional publication as part of the story. In certain examples, the user receiving the response messages can select one or more of the response messages to be published alongside the story that add context to the story, that provide for engaging discourse in the story, and so on. The process 700, in some examples, can select or assign, at block 708, a privacy setting to the response message, such as an anonymous setting. For example, the response message can be selected to be used without attribution to keep the sender of the response message anonymous.

The process 700 then publishes, at block 710, the one or more selected responses alongside the published story. For example, the interaction system 100 is used to provide to other users, via the user systems 102, the responses positioned to be seen within the story's collection of media, such as the media that the response message was responding to. That is, in some cases, the story may include a timeline of media, such as multiple pictures in chronological order. The response message may be targeted as a response to one of the pictures, and thus is published as part of the picture or with the picture.

In some examples, the stories are updatable. That is, during the day, more media may be added to the story's collection. Accordingly, the process 700 updates, at block 712, the story and iterates back to block 704. The process 700 can also publish the response messages at block 710 and then iterate back to block 704, continuously receiving further responses and publishing the selected responses to be seen with other responses in the story or in the updated story. In some examples, the publication of the story and associated responses will automatically cease after a certain time period has elapsed by using the ephemeral timer system 218.

FIG. 8 illustrates an example screenshot 800 of a GUI 802 for selecting stickers, according to some examples. In the depicted example, the GUI 802 includes certain stickers 804, as well as other overlays 806, such as temperature overlays, time overlays, media, animation, AR augmentations, and so on. Also depicted is an icon 808 representative of a question sticker. Accordingly, a user can take a picture, for example, and then select the icon 808 to add a question sticker to the picture, as shown in FIG. 9.

FIG. 9 illustrates an example screenshot 900 of a GUI 902 for placing a question sticker, according to some examples. In the depicted example, the GUI 902 has placed onto a selfie image 904 a question sticker 906, with a "Ask me anything" text. A randomizer GUI control 908 is also shown, which can be activated by the user to randomize the text (or image) in the question sticker 906 with another text or image. The user can also type their own text, and in some examples, enter their own images, into the question sticker 906. The GUI 902 also informs the user, via a label 910, that response messages to the sticker 906 can be shared with others (e.g., with members of a friends group).

FIG. 10 an example screenshot 1000 of a GUI 1002 for previewing a message having a question sticker, according to some examples. In the depicted example, the GUI 1002 that has placed onto the selfie image 904 of FIG. 9 the question sticker 906, with the "Ask me anything" text. GUI controls 1004 are also shown, which can be used to further edit the image 904 by placing text, adding music, and so on. The user can then publish (e.g., send) the resulting image 904 with the overlaid question sticker 906 to one or more users, one or more groups, and so on. The question sticker 906 includes an embedded dynamic element, e.g., a GUI control 1006, that can be used by recipients of the publication to reply, via reply messages, to the question sticker 906.

FIG. 11 depicts three example screenshots 1102, 1104, 1106 of GUIs 1108, 1110, 1112, respectively, according to some examples. In the depicted examples, the GUI 1108 is a GUI that is used to reply, for example to a question sticker and/or story. Accordingly, a GUI sender control 1114 is shown, which in some examples can be automatically populated with a user to reply to, such as the creator of the question sticker and/or story. A label 1116 is also shown, providing an indication that the reply can be shared. The user replying can then enter a reply (e.g., text and/or media reply) via a GUI control 1118, and subsequently send the reply.

The GUI 1110 is an example GUI showing the reply received by the user that created the question sticker and/or story. In the depicted example, a GUI control 1120 shows the user that sent the reply, and the reply 1122 itself. In the example reply 1122, the reply 1122 includes both a picture as well as text (e.g., "Where is that?"). To publish the reply 1122, the user can activate a GUI control 1124. In some examples, a privacy setting for the publishing of the reply 1122 may include a default setting of "anonymous."

The GUI 1112 is an example GUI showing the publishing of the reply 1122. As mentioned earlier, the reply 1122 can be shared to one or more users, user groups, and so on. In the depicted embodiment, the reply 1122 has been overlaid on the originally posted image soliciting replies. Replies can be published in various ways, as shown in FIG. 12.

FIG. 12 depicts three example screenshots 1202, 1204, 1206 of GUIs 1208, 1210, 1212, respectively, according to some examples. The GUI 1208 uses a greenscreen technique to showcase an image 1214 and then shows a reply 1216 only as text. The GUI 1210 displays the original reply 1216, including the text and an image associated with the reply. The GUI 1212 displays both the text and the image of the reply 1216 as a thumbnail. By providing for various ways to display replies, the content creation can provide improved flexibility and aesthetics.

Machine Architecture

FIG. 13 is a diagrammatic representation of the machine 1300 within which instructions 1302 (e.g., software, a program, an application, an applet, an app, or other executable code) for causing the machine 1300 to perform any one or more of the methodologies discussed herein may be executed. For example, the instructions 1302 may cause the machine 1300 to execute any one or more of the methods described herein. The instructions 1302 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1302, sequentially or otherwise, that specify actions to be taken by the machine 1300. Further, while a single machine 1300 is illustrated, the term "machine" shall also be taken to include a collection of machines that individually or jointly execute the instructions 1302 to perform any one or more of the methodologies (e.g., processes 600, 700) discussed herein. The machine 1300, for example, may comprise the user system 102 or any one of multiple server devices forming part of the interaction server system 110. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1308, which may be configured to communicate with each other via a bus 1310. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1312 and a processor 1314 that execute the instructions 1302. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1316, a static memory 1318, and a storage unit 1320, both accessible to the processors 1304 via the bus 1310. The main memory 1306, the static memory 1318, and storage unit 1320 store the instructions 1302 embodying any one or more of the methodologies or functions described herein. The instructions 1302 may also reside, completely or partially, within the main memory 1316, within the static memory 1318, within machine-readable medium 1322 within the storage unit 1320, within at least one of the processors 1304 (e.g., within the processor's cache memory), or any suitable combination thereof, during execution thereof by the machine 1300.

The I/O components 1308 may include a wide variety of components to receive input, provide output, produce output, transmit information, exchange information, capture measurements, and so on. The specific I/O components 1308 that are included in a particular machine will depend on the type of machine. For example, portable machines such as mobile phones may include a touch input device or other such input mechanisms, while a headless server machine will likely not include such a touch input device. It will be appreciated that the I/O components 1308 may include many other components that are not shown in FIG. 13. In various examples, the I/O components 1308 may include user output components 1324 and user input components 1326. The user output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1308 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1330 include acceleration sensor components (e.g., accelerometer), gravitation sensor components, rotation sensor components (e.g., gyroscope).

The environmental components 1332 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1334 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1308 further include communication components 1336 operable to couple the machine 1300 to a network 1338 or devices 1340 via respective coupling or connections. For example, the communication components 1336 may include a network interface component or another suitable device to interface with the network 1338. In further examples, the communication components 1336 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1340 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., main memory 1316, static memory 1318, and memory of the processors 1304) and storage unit 1320 may store one or more sets of instructions and data structures (e.g., software) embodying or used by any one or more of the methodologies or functions described herein. These instructions (e.g., the instructions 1302), when executed by processors 1304, cause various operations to implement the disclosed examples.

The instructions 1302 may be transmitted or received over the network 1338, using a transmission medium, via a network interface device (e.g., a network interface component included in the communication components 1336) and using any one of several well-known transfer protocols (e.g., hypertext transfer protocol (HTTP)). Similarly, the instructions 1302 may be transmitted or received using a transmission medium via a coupling (e.g., a peer-to-peer coupling) to the devices 1340.

Software Architecture

FIG. 14 is a block diagram 1400 illustrating a software architecture 1402, which can be installed on any one or more of the devices described herein. The software architecture 1402 is supported by hardware such as a machine 1404 that includes processors 1406, memory 1408, and I/O components 1410. In this example, the software architecture 1402 can be conceptualized as a stack of layers, where each layer provides a particular functionality. The software architecture 1402 includes layers such as an operating system 1412, libraries 1414, frameworks 1416, and applications 1418. Operationally, the applications 1418 invoke API calls 1420 through the software stack and receive messages 1422 in response to the API calls 1420.

The operating system 1412 manages hardware resources and provides common services. The operating system 1412 includes, for example, a kernel 1424, services 1426, and drivers 1428. The kernel 1424 acts as an abstraction layer between the hardware and the other software layers. For example, the kernel 1424 provides memory management, processor management (e.g., scheduling), component management, networking, and security settings, among other functionalities. The services 1426 can provide other common services for the other software layers. The drivers 1428 are responsible for controlling or interfacing with the underlying hardware. For instance, the drivers 1428 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1414 provide a common low-level infrastructure used by the applications 1418. The libraries 1414 can include system libraries 1430 (e.g., C standard library) that provide functions such as memory allocation functions, string manipulation functions, mathematic functions, and the like. In addition, the libraries 1414 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1414 can also include a wide variety of other libraries 1434 to provide many other APIs to the applications 1418.

The frameworks 1416 provide a common high-level infrastructure that is used by the applications 1418. For example, the frameworks 1416 provide various graphical user interface (GUI) functions, high-level resource management, and high-level location services. The frameworks 1416 can provide a broad spectrum of other APIs that can be used by the applications 1418, some of which may be specific to a particular operating system or platform.

In an example, the applications 1418 may include a home application 1436, a contacts application 1438, a browser application 1440, a book reader application 1442, a location application 1444, a media application 1446, a messaging application 1448, a game application 1450, and a broad assortment of other applications such as a third-party application 1452. The applications 1418 are programs that execute functions defined in the programs. Various programming languages can be employed to create one or more of the applications 1418, structured in a variety of manners, such as object-oriented programming languages (e.g., Objective-C, Java, or C++) or procedural programming languages (e.g., C or assembly language). In a specific example, the third-party application 1452 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1452 can invoke the API calls 1420 provided by the operating system 1412 to facilitate functionalities described herein.

CONCLUSION

Technical advantages include providing for by question stickers and quotable stories that can lead to further engagement, for example, by members of a social network of a messaging application. The question stickers can include contextual stickers that have pre-designed messages, for example, based on holidays, upcoming events (e.g., music concerts), special days (e.g., national Independence Day, Valentine's Day, and so on), friends' birthdays, and the like. The question stickers can also include randomized messages to enable the user to more efficiently ask for questions or for user feedback in a more engaging manner. Certain privacy features are also incorporated. For example, responses can be shared via the messaging application without attribution, thus anonymizing the response. When the user creates a story, the story includes a collection one or more pictures, videos, and other media (e.g., sounds such as music, augmented reality (AR) content, photographic filters, and so on), and the viewers of the story can participate in the story creation, for example, via "quotable replies." That is, a story creator can receive a message from a viewer (e.g., member of the story creator's social group) and then decide to incorporate the reply as part of the story. The reply can also be anonymized, for example, by incorporating the reply without attribution. By enabling a more private and engaging collaboration, for example, via question stickers and quotable stories, the techniques described herein provide for a more efficient and engaging presentation of media content.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software Accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium"

and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall Accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A system, comprising:
   one or more hardware processors; and
   at least one memory storing instructions that cause the one or more hardware processors to perform operations, comprising:
   receiving, via a client device, one or more response messages to a question sticker or to a story;
   presenting, via the client device, a first user interface for selecting from the one or more response messages;
   receiving a selection, via the first user interface, of a response message of the one or more response messages for publication;
   presenting, via the client device, a second user interface for privacy settings after the selection of the response message;
   receiving a selection, via the second user interface, of a privacy setting for the response message; and
   publishing, via the client device, the response message based on the selected privacy setting.

2. The system of claim 1, wherein the question sticker comprises a media overlay comprising text, a picture, a video, an animation, an avatar or a combination thereof, to be disposed on top of a media.

3. The system of claim 1, wherein the question sticker comprises a pre-defined content stored in a database.

4. The system of claim 3, wherein the pre-defined content is based on a date or a date range.

5. The system of claim 4, wherein the date or date range comprises a holiday, a special day, an event, or a combination thereof.

6. The system of claim 3, wherein the pre-defined content is randomly selected.

7. The system of claim 1, wherein selecting, via the client device, the privacy setting for the response message comprises selecting an anonymous setting for a sender of the response message.

8. The system of claim 7, wherein publishing, via the client device, the response message, comprises publishing the response message as an anonymous response message.

9. The system of claim 1, publishing, via the client device, the response message comprises publishing the response message via a social network.

10. The system of claim 9, wherein all members of the social network comprise a friends group of a user of the client device.

11. The system of claim 1, wherein the operations comprise automatically removing the response message from publication.

12. The system of claim 1, wherein the operations comprise selecting, via the client device, the question sticker, and positioning the question sticker onto a location on a media content.

13. The system of claim 12, wherein the media content comprises a picture, a video, an AR augmentation, a text, or a combination thereof.

14. The system of claim 1, wherein the story comprises a collection of media content provided in a timeline order.

15. The system of claim 14, wherein receiving, via the client device, one or more response messages to the story comprises receiving, via the client device, one or more response messages directed to a media content of the collection of media content.

16. The system of claim 1, wherein the operations comprise presenting, via the client device, an indicia to a sender of the response message that the response message is shareable to a social network before the response message is sent by the sender.

17. A method, comprising:
   receiving, via a client device, one or more response messages to a question sticker or to a story;
   presenting, via the client device, a first user interface for selecting from the one or more response messages;
   receiving a selection, via the first user interface, of a response message of the one or more response messages for publication;
   presenting, via the client device, a second user interface for privacy settings after the selection of the response message;

receiving a selection, via the second user interface, of a privacy setting for the response message; and publishing, via the client device, the response message based on the selected privacy setting.

18. A non-transitory computer-readable storage medium, the computer-readable storage medium including instructions that when executed by a computer, cause the computer to:

receive, via a client device, one or more response messages to a question sticker or to a story;

present, via the client device, a first user interface to select from the one or more response messages;

receive selection, via the first user interface, of a response message of the one or more response messages for publication;

present, via the client device, a second user interface for privacy settings after the selection of the response message;

receive selection, via the second user interface, of a privacy setting for the response message; and publish, via the client device, the response message based on the selected privacy setting.

19. The system of claim 1, further comprising:

detecting, via the client device, a contextual event associated with one or more of a date or location;

automatically generating a contextual question sticker based on the detected contextual event; and presenting the contextual question sticker as a selectable option prior to receiving the one or more response messages.

20. The system of claim 1, further comprising:

presenting, via the client device, a randomizer control with the question sticker;

receiving, via the client device, an activation of the randomizer control; and in response to the activation, replacing text or media in the question sticker with randomly selected pre-defined content from a database.

* * * * *